United States Patent [19]

Obear et al.

[11] 4,091,698
[45] May 30, 1978

[54] ROTARY CUTTING BLADE CONTROL SYSTEM

[75] Inventors: Robert F. Obear, Rolling Hills Estates; Bruno A. Rist, Northridge, both of Calif.

[73] Assignee: Western Gear Corporation, Everett, Wash.

[21] Appl. No.: 611,098

[22] Filed: Sep. 8, 1975

[51] Int. Cl.² .......................... B26D 1/28; B26D 7/26
[52] U.S. Cl. ........................................... 83/34; 83/74; 83/530
[58] Field of Search ................ 83/72, 74, 75, 62, 62.1, 83/527, 530, 34; 408/11, 17

[56] References Cited

U.S. PATENT DOCUMENTS

| | | | |
|---|---|---|---|
| 1,368,369 | 2/1921 | Sykes | 83/72 X |
| 2,649,646 | 8/1953 | Remmen | 83/72 |
| 2,989,674 | 6/1961 | Hawkins et al. | 83/72 X |
| 3,107,903 | 10/1963 | Newton | 408/11 X |
| 3,220,315 | 11/1965 | Mathias | 408/11 X |
| 3,273,425 | 9/1966 | Hodgson | 408/17 |
| 3,545,310 | 12/1970 | Porath et al. | 408/11 |
| 3,552,253 | 1/1971 | MacDonald | 83/527 X |
| 3,571,834 | 3/1971 | Mathias | 408/11 X |
| 3,592,094 | 7/1971 | Greenblatt | 83/72 |
| 3,721,139 | 3/1973 | Robinson et al. | 83/527 X |
| 3,875,839 | 4/1975 | Aizawa | 83/527 X |
| 3,909,150 | 9/1975 | Schaer | 408/17 |

Primary Examiner—Willie G. Abercrombie
Attorney, Agent, or Firm—Seed, Berry, Vernon & Baynham

[57] ABSTRACT

A rotary cutting blade control system which automatically varies the feed rate to maintain a constant material removal rate. The system senses the current in an electric motor driving the cutting blade and automatically adjusts the feed rate to maintain the motor current constant. The system adjusts a hydraulic valve in the hydraulic system operating the blade support to move the blade in or out whenever the current deviates from a standard which is set by the operator. The control system also includes a circuit for detecting when the load on the blade has dropped below a preset level indicating that the blade has completed the cut and automatically commands the hydraulic system to return the blade to a start position. An additional control circuit operating in conjunction with the no-load sensing circuit automatically produces a command to stop the blade close to the work piece to save time and motion when multiple cuts are being performed. This circuit operates by establishing a reference level indicating the position of the blade at the start of a cut.

12 Claims, 3 Drawing Figures

ROTARY CUTTING BLADE CONTROL SYSTEM

BACKGROUND OF THE INVENTION

This invention relates to automatic servo control systems and more particularly relates to a servo control system which controls the feed rate and automatic return of a cutting blade.

In the past cutting systems require frequent adjustments by the operator when different size, shapes and hardness of materials are encountered. For example, when a circular member is being cut the amount of material being cut at any one time varies across the cross section of the material. To compensate for this the operator has to constantly adjust the feed rate in order to maintain a uniform cut or use a constant feed rate at a low enough level to permit cutting through various sizes and shapes and hardnesses of material. These are distinct disadvantages because they can cause heating of the blade, excessive wear and/or loss of time.

SUMMARY

The present invention avoids these disadvantages by automatically varying the feed rate to maintain the load on the cutting blade constant when cutting materials differing in size shape or hardness. This is accomplished by sensing and comparing the motor current with a predetermined reference and automatically operating a hydraulic servo system in response to deviations of the motor current from the reference established. In addition the system also returns the blade to a start position at the completion of a cut by sensing a drop in motor current. That is, when the blade has passed through the work piece the motor current drops below a predetermined level and stays there for a sufficient amount of time to produce a command signal which commands the hydraulic servo system to withdraw the cutting blade from the work piece. In order to save time and compensate for wear of the cutting blade during multiple cuts a third circuit is provided which establishes a reference level by sensing when the cutting blade begins to cut and produces a stop command to the hydraulic servo system when the blade is being withdrawn from a cut by the automatic return circuit.

It is one object of the present invention to provide a cutting blade control system which will automatically compensate for materials irregular in shape, size and hardness.

Another object of the present invention is to provide a cutting blade control system which will saw at a constant removal rate regardless of material.

Another object of the present invention is to provide a cutting blade control system which will automatically return the blade after a cut has been completed.

Still another object of the present invention is to provide a cutting blade control system which will compensate for blade wear.

Another object of the present invention is to provide a cutting blade control system which will automatically reposition the blade close to the work piece at the completion of a cut.

Other objects, advantages, and novel features of the invention will become apparent from the following detailed description of the invention when considered in conjunction with the accompanying drawings wherein like reference numbers identify like parts throughout the drawings.

DESCRIPTION OF THE PREFERRED EMBODIMENT

Figure 1:
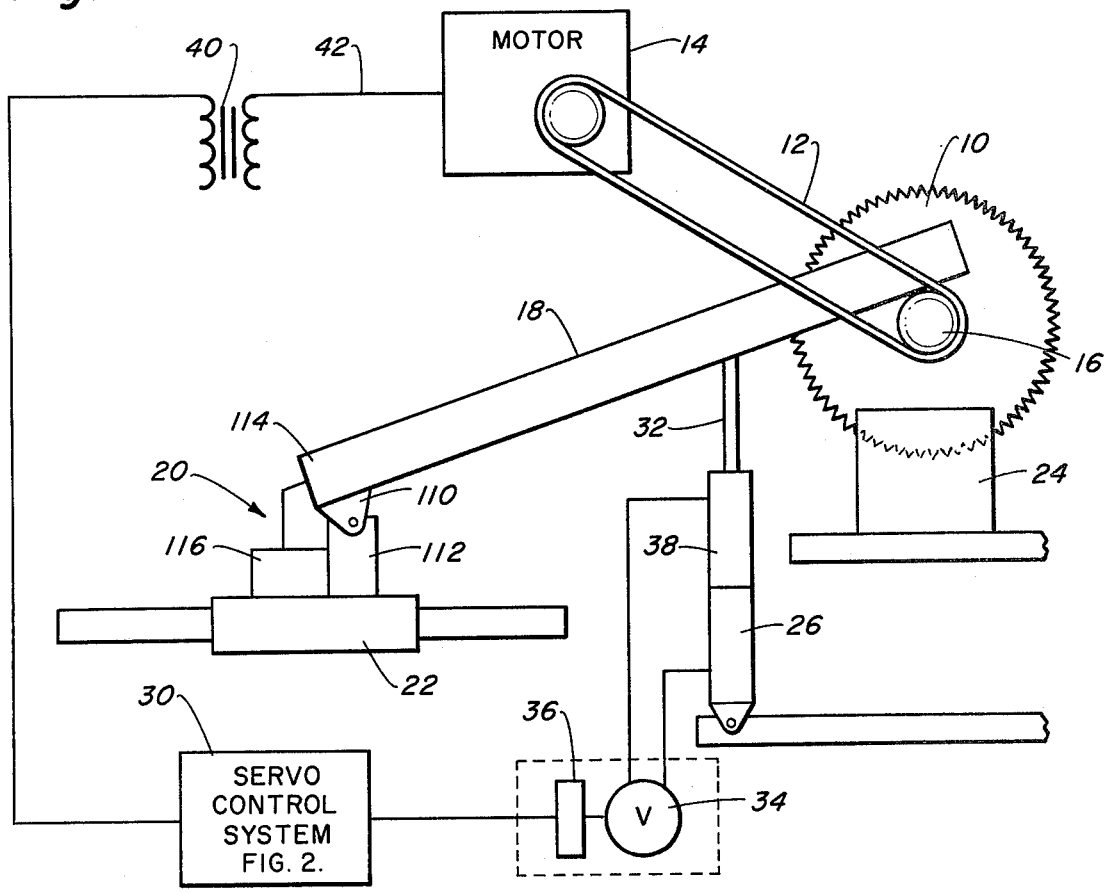
FIG. 1 is a semi-schematic illustration of a cutting blade system according to the invention.

A cutting system is shown in FIG. 1 in which a circular cutting blade 10 driven by a belt 12 from a motor 14 is journaled on a shaft 16 at the end of an arm 18 which is oscillated back and forth by a linear reciprocating mechanism shown at 20, driven hydraulically by a cylinder shown at 22. Linear reciprocating mechanisms are known in the art, such as the one shown in U.S. Pat. No. 3,046,707. A workpiece 24 is cut into by the saw 10, which is moved with respect thereto by a hydraulic cylinder 26 pivoted at one end 28. The piston rod 32 of the cylinder 26 is pivotally connected to the arm 18. The hydraulic cylinder 26 is double-acting and receives hydraulic fluid at each end through a hydraulic servo valve 34 which is controlled by solenoid coil 36. Thus, the force at any given instant urging the saw 10 against (or out of) the cut in the workpiece 24 is dependent on the relative hydraulic pressures on each side of the piston 38 and the cylinder 26.

The cylinder 26 in turn is dependent upon the position of the servo valve 34 in accordance with the signals in the solenoid actuating coil 36. The actuating coil 36 is operated by the servo control system 30 which receives signals from a pickup coil 40 and produces command functions to control hydraulic cylinder 26.

Figure 2:
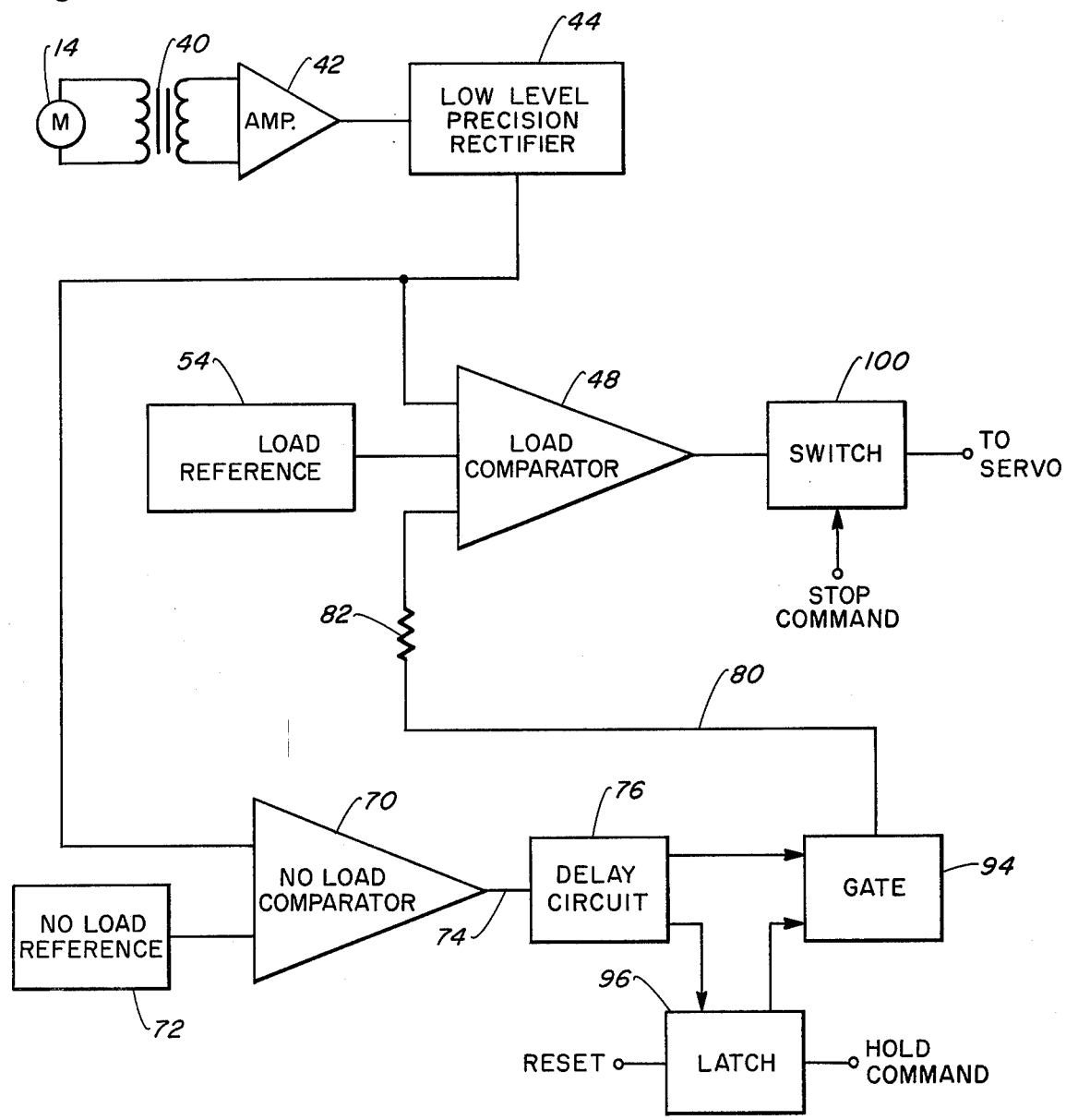
FIG. 2 is an electrical diagram of the servo control system for regulating the blade cutting system on FIG. 1.

The servo control circuit for actuating solenoid coil 36 is shown in greater detail in FIG. 2. The control circuit consists of a current transformer pickup loop 40 which senses current in the lead feeding current to the motor 14. The signal picked up in loop 40 is amplified in 42 and fed to a rectifying circuit 44 which is a low level precision rectifier producing a DC output directly proportional to the magnitude of the AC current picked up in loop 40. The DC output of rectifier 44 is compared in a comparator 48 to an adjustable load reference 54. Any deviation between the load reference signal and the output of the rectifier 44 produces an output from comparator 48 which is applied to the solenoid coil 36 to operate the servo valve 34 up or down. The servo valve 34 is commanded to move the blade one way or the other (up or down), depending upon which direction the current samples in the wire 41 deviate from the desired standard, fixed value of input current to the motor 14. This, of course, as far as the operator is concerned is determined by the setting of the load reference signal 54 which can be a potentiometer, if desired.

From moment to moment the load encountered by the rotating blade 10 can vary in cutting of the workpiece 24. That is, if the workpiece has areas which increase in hardness, then the load on the blade would increase correspondingly. In order to compensate for this increased hardness, the instantaneous increase in the load on the blade 10 is instantly sensed as an increase in motor current by the servo control system from the sample received from pickup coil 40 and produces an output command signal to change the feed rate to maintain the removal rate and load constant. That is, the servo control system commands the piston 38 to lift the saw blade 10 when thus slowing down the feed rate and maintaining the load and material removal rate constant. On the other hand, if the blade encountered somewhat softer material (i.e. a drop in motor current), the feed rate of the blade is automatically increased. Thus, the system acts to drive the saw blade deeper into the cut to maintain the constant removal rate by increasing the feed rate.

There is also a steady back-and-forth oscillating motion imposed by the cylinder 22. The control functions of this system produce a uniform cut of the workpiece 24 and a faster cut because the blade is always cutting at an optimum removal rate. An added benefit of this system is that it produces even wear of the cutting wheel or blade 10 and allows the cut to be dressed by itself. When the cut tends to pinch the saw blade 10, the system will retract from the cut to the point where the pinching force allows the saw blade to again advance. This oscillation of the saw blade 10 in the cut automatically dresses the cut and relieves the pinch. Wear at the periphery of the saw blade is also automatically accommodated for.

The invention also accommodates itself to automatic return of the cutting head by use of an auxiliary circuit that senses when the load has dropped below and is maintained below a predetermined level. For example, assuming that the full load reference signal has been adjusted by a potentiometer to maintain a current draw for the motor of two hundred amperes, then during the cutting operation the current will vary up and down around this 200 ampere line as an optimum. This optimum current would be governed by the instantaneous position of the piston 38 which is regulated to the servo valve 34. When the cut through the workpiece 24 is completed, the load on the saw drops sharply. The DC signal sensed at 46 is also applied to another comparator 70 which has a no-load reference signal 72 set at some predetermined level, for example, at 100 amperes.

During normal operations it is very possible that there may be a momentary drop of current below 100 amperes, but that would be quickly nulled out as the load is resumed by operation of the piston 38 and would not endure for but a fraction of a second. In order to compensate for these momentary drops, the readout of the comparator at 74 is applied to a delay circuit shown at 76. Now, if there is a drop in the current below a predetermined level which endures for more than a predetermined time, it causes a change in the output from the delay circuit.

The output of the delay circuit 76 is applied to the comparator 48 through the resistor 82 and gate 94. This output is of opposite polarity to the voltage set in by the load reference 54 and causes a new, lower reference to be established in the comparator. This commands the servo valve 34 to cause the piston 38 to lift the blade 10 completely away from the workpiece 24.

As soon as the blade encounters the workpiece 24 and starts to cut, there is an output signal from the rectifier 44 corresponding to the current sensed at 40. The output of the rectifier 44 is applied to the comparator 70 producing an unbalance, since the no-load reference 72 is set for a much lower value, say at 100 amperes. Thus, at the very start of the cutting a signal appears at the output of the comparator 70 and stays there until the signal from rectifier 44 drops to a no-load value at 40; this being the no-load range of the motor 14 and indicating that the cut has been completed. This also is an indication that the blade 10 is now in a through cut position effectively free of the work piece 24. At this point the output of the delay circuit 76 disappears and it is the disappearance of this signal that effects the withdrawal of the blade from the work piece 24.

The gate 94 produces an output to the comparator 48 to command the blade to withdraw whenever the delay circuit 76 output drops due to a no-load level. Upon the appearance of a signal output from delay circuit 76 the latch circuit 96 is actuated producing an output to turn off the gate 94. Thus the latching circuit 96 acts as an inhibiting circuit preventing any output from gate 94 until there is a change in the output of the delay circuit 76. As soon as the output signal from delay circuit 76 terminates it produces a low level or false signal input to gate 94 which produces an output command signal to comparator 48 to command the blade to withdraw. Thus, upon completing the cut the blade 10 is commanded to back off. The back off signal applied to the servo 34 keeps the piston 38 moving in a direction to retract the blade 10 from the work piece 24 until it reaches a stop or home position.

However, it is undesirable for reasons which will become obvious to cause the blade to be completely retracted to the home position. It is only necessary to retract the blade far enough to clear the work piece 24 to a start position in the interest of time and efficiency. For this reason the position memory circuit of FIG. 3 was provided which allows the blade 10 to return only to a previously memorized start position clear of the work piece 24 and at that point stop.

Figure 3:
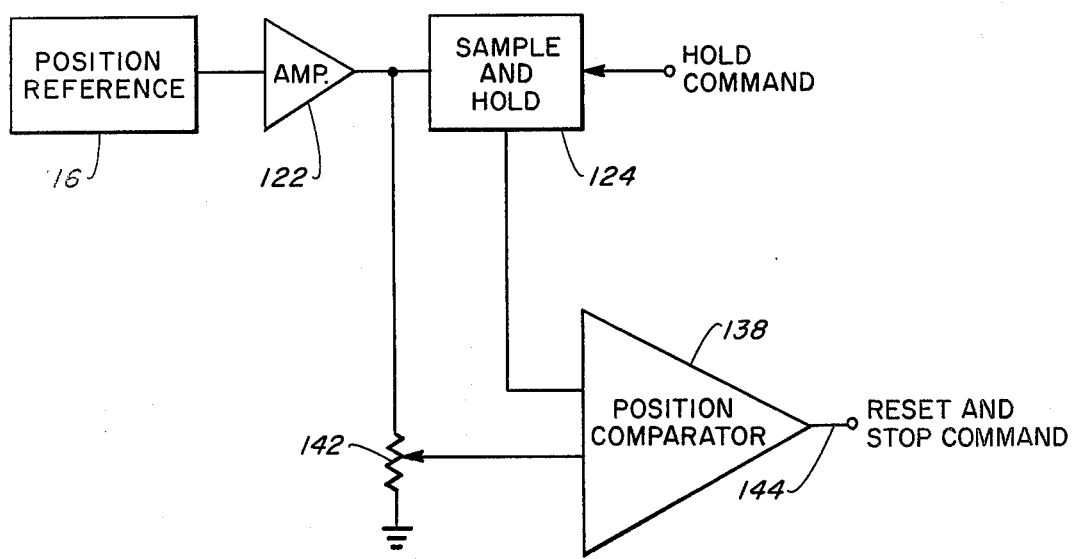
FIG. 3 is an electrical diagram of a position memorizing circuit.

The circuit of FIG. 3 is comprised of a position reference signal 116 which is proportionate to the position of the blade relative to the work piece and will be described in greater detail herein. The position reference signal is amplified at 122 and applied through a potentiometer 142 to another comparator 138. The output of the amplifier 122 is also connected to a sample and hold circuit 124 which provides an output to comparator 138. The sample and hold circuit 124 is operated by a hold command signal from latch 96.

As was previously discussed, when there is an output from delay circuit 76, the latch circuit 96 is actuated. The output of latch 96 inhibits gate 94 and also provides a hold command to sample and hold circuit 124. Thus, the sample and hold circuit stores a signal representing the position of the blade at the time the cut begins.

The position memory circuit can be better understood by reference to FIG. 1 in which the arm 18 is shown pivoted at the end opposite the blade on a part 112 that is reciprocated back and forth. As the shaft 18 is moved up and down about the pivot point 110 by the action of the hydraulic piston 38, the rear end of the shaft indicated at 114 also moves up and down. A liner potentiometer 116 with its wiper arm (not shown) mechanically connected to the arm 18 produces an accurate signal representing the position of the arm 18 and thus the position of the blade 10. Obviously the potentiometer 116 is suitably mounted to measure only the linear motion of arm 18.

Referring again to FIG. 3, the operation of the position memory circuit to command the servo 34 is as follows. A position reference signal is produced in 116, is amplified at 122, and connected to a sample and hold circuit 124. Since the output of the latch circuit represents the beginning of a cut and this produces a hold command to the sample and hold circuit, the signal preserved represents the position of the blade at the time the cut began. The position reference signal 116 is connected to decrease and will continue to drop as the blade cuts through the workpiece 24 until the cut is completed. As was described above, at the completion of the cut the system commands the blade to withdraw which means the position reference signal 116 now begins to rise. At the moment the saw blade 10 clears the workpiece 24. The voltage at the output of buffer amplifier 122 is exactly equal to that which we have previously stored in sample and hood circuit 124. This, however, does not actuate comparator 138 because of the voltage division occurring because of offset potentiometer 142. The potentiometer 142 provides a slight offset in order to be sure that the blade clears the workpiece area. Thus, the voltage output of amplifier 122 and hence the cutting head or blade 10 must rise slightly clear of the workpiece 24 until the voltage input to comparator 138 from potentiometer 122 becomes equal to that stored in the sample and hold circuit 124. This condition is sensed by the comparator 138, causing an output command to stop the blade. That is, the signal output at 144 is applied to a switch 100 (FIG. 3), such as a relay or transistor, cutting off servo valve 34 to bring the cutting blade 10 to a halt.

The output of comparator 138 also provides the additional function of resetting latch 96. That is, the output 144 is applied to latch 96 to reset it for the beginning of another cut.

This servo control system for the rotary cutting blade is sufficiently automatic that it frees the operator from a constant monitoring job which up to this time has always been necessary. The system also accommodates for abrupt wheel breakage, because if there is a breakage in the wheel the circuit senses "no load" and retracts the blade, stopping the whole operation. Another definite practical benefit is that it not only returns the blade automatically but it returns it to an optimum position clear of the workpiece, as it must be, which cuts down on the loss of time.

Thus, there has been disclosed a system which accurately maintains the cutting load of a blade during the cutting of a workpiece. In addition the circuit automatically retracts the blade and provides a commond signal to stop the blade when it clears the workpiece, thus compensating for blade wear and positioning the blade for another cut.

Obviously many modifications, variations of the present invention are possible in the light of the above teachings. It is therefore to be understood that the full scope of the invention is not limited to the details disclosed herein and may be practiced otherwise than as specifically described.

What is claimed is:

1. A rotary cutting blade servo control system comprising:
    rotary drive means for rotating the cutting blade,
    means for positioning the blade during a cut between a home position spaced from a surface of a workpiece, to a through-cut position, and back to a start position close to the surface of said workpiece,
    control means controlling said positioning means,
        said control means including automatic return means returning said blade direct to said start position after a cut has been completed without going through the home position, said automatic return means including position reference means for producing a position reference indicative of the position of the center of said blade,
    sample and hold means for recording as a contact reference the position reference produced at initial contact of the blade with the workpiece during each cut,
    sensing means generating a halt command when said blade is returning from a through-cut position and said position reference has a predetermined relation to said contact reference, and
    switch means for stopping the blade positioning means responsive to said halt signal from the sensing means thereby automatically positioning the blade at a subsequent start position close to a workpiece for the start of a new cut.

2. The system according to claim 1 wherein said position reference means is a potentiometer connected to produce an output indicative of the position of the center of said blade.

3. The system of claim 1, said sensing means including means for sensing an increase in load on the rotary drive means.

4. The system of claim 1 wherein said sensing means further includes blade halt means for generating said halt command when the center of said blade has been withdrawn away from said workpiece to a predetermined point farther from said workpiece than the position of the center of said blade at initial contact of the blade with the workpiece during each cut thereby insuring that the periphery of said blade is spaced from said workpiece at the end of each cut.

5. The system of claim 4 wherein said blade halt means comprise:
    divider means for dividing said position reference by a predetermined multiple, and
    comparator means generating said halt command when the output of said divider means is equal to the output of said sample and hold means, thereby withdrawing said blade a clearance distance beyond the periphery of said workpiece at the start of each cut.

6. A control system for a rotary cutting blade, comprising:
    rotary drive means for rotating the cutting blade,
    positioning means for moving said blade in a cutting cycle into and out of a workpiece,
    reference means for continuously producing during said cutting cycle a position reference indicative of the position of the center of said blade,
    sample and hold means for recording as a contact reference the position reference produced at initial contact of the blade with the workpiece during said cutting cycle, and
    comparator means continuously receiving the position reference and the output of said sample and hold means for continuously producing a comparator output corresponding to the difference between said position reference and said contact reference during said cutting cycle, thereby continuously determining the position of the center of the blade after initial contact of the blade with the workpiece relative to the position of the center of the blade at said initial contact.

7. The system of claim 6 further including blade control means operatively connected to said positioning means and using said comparator output for stopping movement of said blade out of the workpiece when said comparator output is at a predetermined value at the completion of said cutting cycle.

8. A system for making successive cuts through a workpiece with a rotary blade, having a periphery which wears during use comprising:

positioning means for positioning the center of said blade during a plurality of successive cutting cycles in which said blade moves from a start position wherein the periphery of said blade is close to the surface of a workpiece, to a through-cut position through the workpiece, and back to a start position for the next cutting cycle; and control means for moving the start position for each successive cutting cycle toward said workpiece a distance corresponding to the depth of blade-wear during the cutting cycle immediately prior to the cutting cycle just completed, thereby compensating for wear.

9. The system of claim 8 wherein said control means comprises:

position reference means for continuously providing a position reference indicative of the position of the center of said blade, sensing means for continuously providing a blade contact reference indicative of the position of the center of said blade as said blade initially contacts said workpiece during each cutting cycle while moving from the respective start position at the beginning of each cutting cycle, and comparator means operatively connected to said positioning means for stopping movement of said blade away from said through-cut position at the end of each cutting cycle when said position reference has a predetermined relationship to said blade contact reference.

10. A method of making successive cuts through a workpiece with a rotary blade, having a periphery which wears during use comprising:

commencing a first cutting cycle by moving said blade toward the workpiece from a first start position wherein the periphery of said blade is close to the workpiece, sensing as a first contact reference the position of the center of said blade at initial contact of the blade with the workpiece, completing the first cutting cycle by returning the blade to a second start position established by a predetermined relationship to the first contact reference, commencing a second cutting cycle by moving said blade toward the workpiece from said second start position, sensing as a second contact reference the position of the center of said blade at initial contact of the blade with the workpiece, completing the second cutting cycle by returning the blade to a third start position established by a predetermined relationship to the second contact reference whereby the third start position is closer to the workpiece than the second start position to thereby compensate for wear of said blade during the first cutting cycle.

11. A method of making successive cuts through a workpiece with a rotary blade, having a periphery which wears during use comprising:

commencing a first cutting cycle by moving said blade toward the workpiece from a home position wherein the periphery of said blade is relatively remote from the workpiece, sensing as a first contact reference the position of the center of said blade at initial contact of the blade with the workpiece, completing the first cutting cycle by returning the blade to a first start position established by a predetermined relationship to the first contact reference, commencing a second cutting cycle by moving said blade toward the workpiece from said first start position, sensing as a second contact reference the position of the center of said blade at initial contact of the blade with the workpiece, and completing the second cutting cycle by returning the blade to a second start position established by a predetermined relationship to the second contact reference whereby the second start position is closer to the workpiece than the first start position to thereby compensate for wear of said blade during the first cutting cycle.

12. In combination with a control system for a rotary cutting blade having a periphery which wears during use including rotary drive means for rotating said blade, positioning means for positioning the center of said blade during a plurality of cutting cycles from a start position wherein the periphery of said blade is close to the surface of a workpiece, past a blade contact position wherein the periphery of said blade contacts said workpiece, to a cutting position within the workpiece, and back to a subsequent start position; a blade position comparator system, comprising:

reference means for continuously producing during said cutting cycle a position reference indicative of the position of the center of said blade, sample and hold means for recording the position reference produced at said blade contact position responsive to said blade contacting said workpiece, and for retaining said position reference in said sample and hold means until said blade reaches a blade contact position during a subsequent cutting cycle, and comparator means receiving said position reference and the output of said sample and hold means for producing an output corresponding to the difference between said position reference and said sample and hold output such that said comparator output indicates the difference between the position of the center of said blade at said blade contact position and the instantaneous position of the center of said blade, said difference being, at the blade contact position for said subsequent cutting cyle, an indication of the wear of said blade during the previous cutting cycle.

* * * * *